(No Model.)
C. W. & G. H. JEWETT & B. F. NICHOLS.
ROAD CART.
No. 363,241. Patented May 17, 1887.
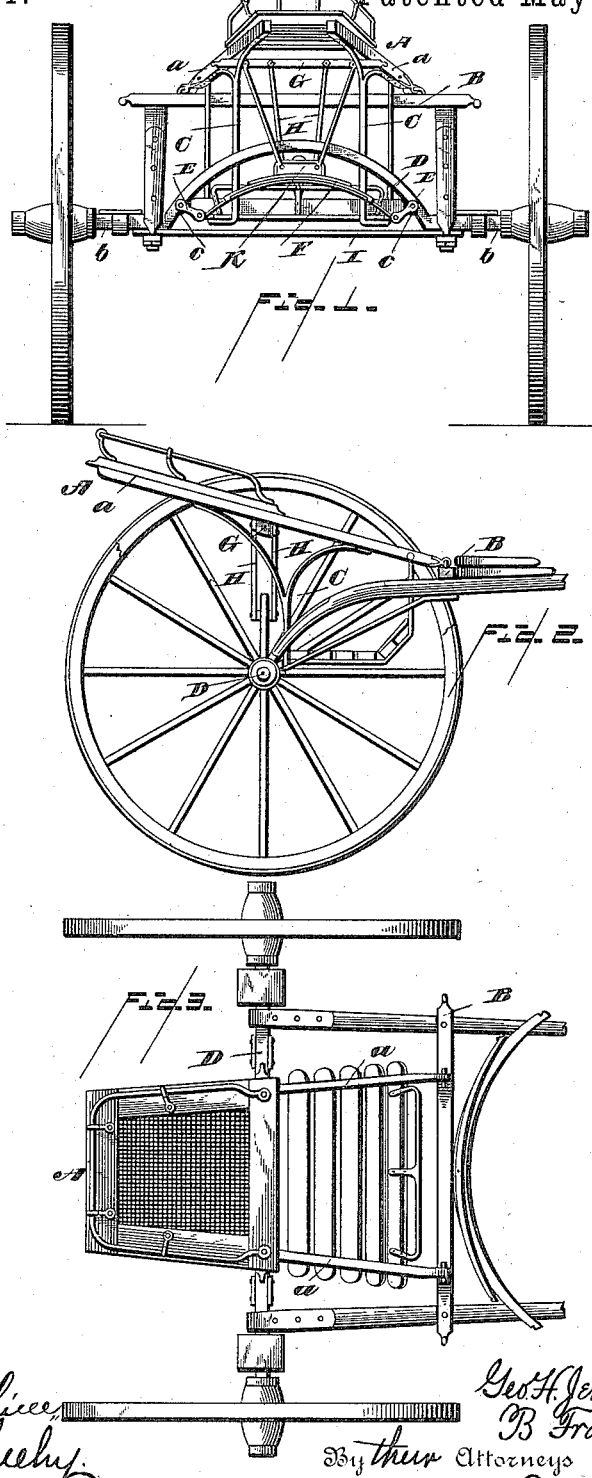

UNITED STATES PATENT OFFICE.

CHARLES W. JEWETT, GEORGE H. JEWETT, AND B. FRANK NICHOLS, OF JACKSON, MICHIGAN.

ROAD-CART.

SPECIFICATION forming part of Letters Patent No. 363,241, dated May 17, 1887.

Application filed November 26, 1886. Serial No. 219,997. (No model.)

*To all whom it may concern:*

Be it known that we, CHARLES W. JEWETT, GEORGE H. JEWETT, and B. FRANK NICHOLS, citizens of the United States, residing at Jackson, in the county of Jackson and State of Michigan, have invented certain new and useful Improvements in Road-Carts; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in road-carts or sulkies; and it consists in the construction, novel combination, and adaptation of devices, as will be hereinafter more fully set forth, and particularly pointed out in the claims.

In the accompanying drawings, Figure 1 is a rear view of a road-cart or sulky, showing our improvements applied. Fig. 2 is a side view with the thills broken away, and Fig. 3 is a plan view.

Referring by letter to the said drawings, A indicates the seat frame, composed of the rearwardly-converging lateral bars $a\ a$, which are hinged at their forward ends to the transverse bar B, which is made fast to the thills. From these bars $a\ a$ extend the hangers C C, which are fashioned to receive and support the slatted foot-rest, as shown.

D indicates the axle, which is arched from the straight portions $b\ b$ for the attachment of the thill-irons, and is provided with lug-journals $c\ c$ at suitable distances above the said plain portions for the reception of bolts to attach the links E E thereto, the opposite ends of the said links being connected with the opposite ends of the spring F.

It will be seen that the spring is thus arranged beneath the axle, and consequently beneath the driver's seat, thereby obviating the horse movement.

G indicates a transverse bar which is suitably secured to the under side of the seat-frame, and connects the said frame with the springs beneath the axle by means of metallic rods H passing at each side of the axle.

K indicates the clip for connecting the lower ends of the rods H with the springs by means of bolts or other suitable fastening devices.

I indicates a brace-bar, which is secured at opposite ends to the under sides of the straight portions $b$ of the axle, and is designed to prevent spreading or longitudinal movement of the same. This bar I may be secured to the axle by clips, bolts passed through the axle, or by other suitable fastening devices.

By the construction illustrated it will be seen that the parts may be very light and cheap and the whole manufactured at a small expense.

While it is obvious that the spring may in some cases be secured to the axle above the same, yet we prefer to arrange the spring as illustrated, and we attach importance to the fact that the spring is arranged beneath the axle and the seat secured to the said spring.

Having described this invention, what we claim is—

1. The combination, with the thills and cross-bar secured thereto, of the seat-frame hinged to the said cross-bar above the thills and supported in rear by the spring secured to and depending from the arched axle, substantially as specified.

2. The combination, with the arched axle, of the brace rod secured to opposite ends thereof, the spring arranged beneath the said arch and connected thereto, and the seat-frame supported on said spring, substantially as specified.

3. The combination, with the arched axle having lug-journals near opposite ends, of the spring secured to the said journals at opposite ends beneath the axle and a hinged seat-frame supported on said spring, substantially as specified.

4. The combination, with the arched axle, of the spring clipped directly beneath the same, the seat-frame hinged to the cross-bar of the thills, and the arms connecting the seat-frame and passing on opposite sides of the axle, substantially as specified.

5. The combination of the hinged seat-frame composed of the rearwardly-converging lateral bars, the foot-rest composed of the hangers secured to the said bars, and the slats secured thereto, the spring supporting the seat, the arms connecting the seat with the spring, the arched axle supporting the spring from its under side, and the brace-rod secured to the axle in the plane of its arch, substantially as specified.

In testimony whereof we affix our signatures in presence of two witnesses.

CHARLES W. JEWETT.
  GEORGE H. JEWETT.
  B. FRANK NICHOLS.

Witnesses:
 E. A. CLEMENT,
 GEORGE F. McCANDLESS.